(12) United States Patent
Xianghui

(10) Patent No.: US 9,031,348 B2
(45) Date of Patent: May 12, 2015

(54) EDGE-PRESERVING FILTERING METHOD AND APPARATUS

(71) Applicant: Fujitsu Limited, Kawasaki (JP)

(72) Inventor: Bai Xianghui, Shanghai (CN)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 13/835,581

(22) Filed: Mar. 15, 2013

(65) Prior Publication Data

US 2013/0259397 A1  Oct. 3, 2013

(30) Foreign Application Priority Data

Mar. 27, 2012 (CN) .......................... 2012 1 0092488

(51) Int. Cl.
  *G06K 9/40* (2006.01)
  *G06T 5/10* (2006.01)
  *G06T 5/00* (2006.01)

(52) U.S. Cl.
  CPC . *G06T 5/10* (2013.01); *G06T 5/002* (2013.01); *G06T 2207/20012* (2013.01); *G06T 2207/20192* (2013.01)

(58) Field of Classification Search
  USPC ......... 382/260, 261, 266, 268, 275, 103, 141, 382/166, 173; 128/898; 348/207.1, 207.2, 348/207.99, 364; 358/1.18; 375/240.29, 375/E7.135; 606/12; 607/89
  See application file for complete search history.

(56) References Cited

U.S. PATENT DOCUMENTS

| | | | |
|---|---|---|---|
| 7,734,088 B2 * | 6/2010 | Bhattacharjya et al. | 382/166 |
| 8,295,599 B2 * | 10/2012 | Katougi et al. | 382/173 |
| 8,441,537 B2 * | 5/2013 | Hayasaki | 348/207.1 |
| 8,587,818 B2 * | 11/2013 | Imaizumi et al. | 358/1.18 |
| 8,740,958 B2 * | 6/2014 | Anderson et al. | 607/89 |

* cited by examiner

*Primary Examiner* — Anh Do
(74) *Attorney, Agent, or Firm* — Staas & Halsey LLP

(57) ABSTRACT

An edge-preserving filtering method and apparatus. The edge-preserving filtering method includes: acquiring an upper edge pixel P(x,y–n), a lower edge pixel P(x,y+m), (m+n) left edge pixels P(x–p,y'), and (m+n) right edge pixels P(x+q,y') of a pixel to be filtered P(x,y), wherein "x", "y", "m", "n", "p" and "q" are all positive integers, and "y" takes an integer larger than "y–n" and less than "y+m" in turn; acquiring a filtered pixel value of the pixel to be filtered by using pixel values of the pixel to be filtered, the upper edge pixel, the lower edge pixel, the left edge pixels and the right edge pixels. The edge-preserving filtering method and apparatus in accordance with an embodiment utilize edge information around the pixel to be filtered to swiftly acquire a set of pixels for filtering the pixel to be filtered, and thus implement edge-persevering filtering.

12 Claims, 2 Drawing Sheets
(1 of 2 Drawing Sheet(s) Filed in Color)

EDGE-PRESERVING FILTERING METHOD AND APPARATUS

CROSS-REFERENCE TO RELATED APPLICATIONS

This application is based upon and claims the benefit of foreign priority of Chinese Patent Application No. 201210092488.6, filed on Mar. 27, 2012, the entire contents of which are incorporated herein by reference.

FIELD OF THE INVENTION

The invention relates to image processing, and in particular to an edge-preserving filtering method and apparatus.

BACKGROUND

Image filtering, i.e., restraining noises of an image while preserving specific characteristics as more as possible of the image, is a necessary operation in image processing, and its processing result directly affects effectiveness and reliability of following image processing and analysis.

Due to imperfection of imaging systems, transmission mediums and recording devices and so on, digital images usually suffer from pollutions of various noises when they are formed, transmitted and recorded. Additionally, in some image processing steps, when an input object is worse than expected in image quality, noises also would be introduced to a result image. These noises usually appear as isolated pixels or pixel blocks that would cause comparatively strong visual effect on an image. For digital image signals, noises usually appear as maximum or minimum extreme values. The extreme values affect real gray values of image pixels through adding or subtracting computation, which results in bright or dim spot interferences on the image, greatly degrades the quality of the image and affects subsequent works such as image restoration, segmentation, feature extraction, image identification and so on.

To construct a filter capable of restraining noises effectively, the following two basic problems must be taken into consideration: (1) removing noises in an image effectively; and (2) preserving shape, size, geometry and topology characteristics of the image.

Edge-preserving filtering technique is widely used in digital image processing. This technique can effectively preserve edge information of an image while filtering the image. Traditional edge-persevering filters comprise bilateral filters, weighted least squares (WLS) filters and so on. The computation of these filters is relatively complex, so it is difficult for the filters to implement real-time processing.

SUMMARY OF THE INVENTION

In view of the problems stated above, the invention provides a novel edge-preserving filtering method and apparatus.

An edge-preserving filtering method in accordance with an embodiment of the invention, comprising: acquiring an upper edge pixel $P(x,y-n)$, a lower edge pixel $P(x,y+m)$, $(m+n)$ left edge pixels $P(x-p,y')$, and $(m+n)$ right edge pixels $P(x+q,y')$ of a pixel to be filtered $P(x,y)$, wherein "x", "y", "m", "n", "p" and "q" are all positive integers, and "y'" takes an integer larger than "y−n" and less than "y+m" in turn; acquiring a filtered pixel value of the pixel to be filtered by using pixel values of the pixel to be filtered, the upper edge pixel, the lower edge pixel, the left edge pixels and the right edge pixels.

An edge-preserving filtering apparatus in accordance with an embodiment of the invention, comprising: an edge acquiring unit for acquiring an upper edge pixel $P(x,y-n)$, a lower edge pixel $P(x,y+m)$, $(m+n)$ left edge pixels $P(x-p,y')$, and $(m+n)$ right edge pixels $P(x+q,y')$ of a pixel to be filtered $P(x,y)$, wherein "x", "y", "m", "n", "p" and "q" are all positive integers, and "y'" takes an integer larger than "y−n" and less than "y+m" in turn; a pixel filtering unit for acquiring a filtered pixel value of the pixel to be filtered by using pixel values of the pixel to be filtered, the upper edge pixel, the lower edge pixel, the left edge pixels and the right edge pixels.

The edge-preserving filtering method and apparatus in accordance with an embodiment of the invention utilize edge information around the pixel to be filtered to swiftly acquire a set of pixels for filtering the pixel to be filtered, and thus implements edge-persevering filtering.

DESCRIPTION OF THE DRAWINGS

The patent or application file contains at least one drawing executed in color. Copies of this patent or patent application publication with color drawing(s) will be provided by the Office upon request and payment of the necessary fee.

The invention can be better understood through the following description in conjunction with the accompanying drawings, wherein.

DETAILED EMBODIMENTS

Next, characteristics and exemplary embodiments of various aspects of the invention will be described in detail. The following descriptions cover many specific details so as to provide comprehensive understanding of the invention. However, it would be obvious for those skilled in the art that the invention may be implemented in absence of some of the specific details. The following descriptions of embodiments are merely for providing clearer understanding of the invention through showing examples of the invention. The invention is not limited to any specific configuration and algorithm provided below; and instead, it covers any modification, substitution, and improvement of corresponding elements, components and algorithms without departing from the spirit of the invention.

The invention provides a quick edge-preserving filtering method and apparatus. The edge-preserving filtering method and apparatus in accordance with an embodiment of the invention utilize edge information around a pixel to be filtered to swiftly acquire a set of pixels for filtering, and thus implements edge-persevering filtering.

Figure 1:
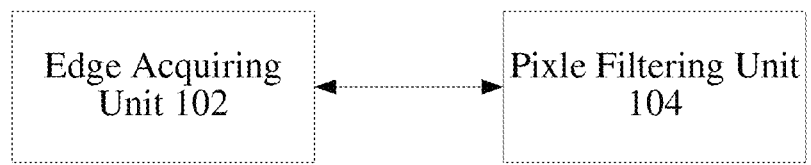
FIG. 1 illustrates a block diagram of an edge-preserving filtering apparatus in accordance with an embodiment of the invention.
Figure 2:
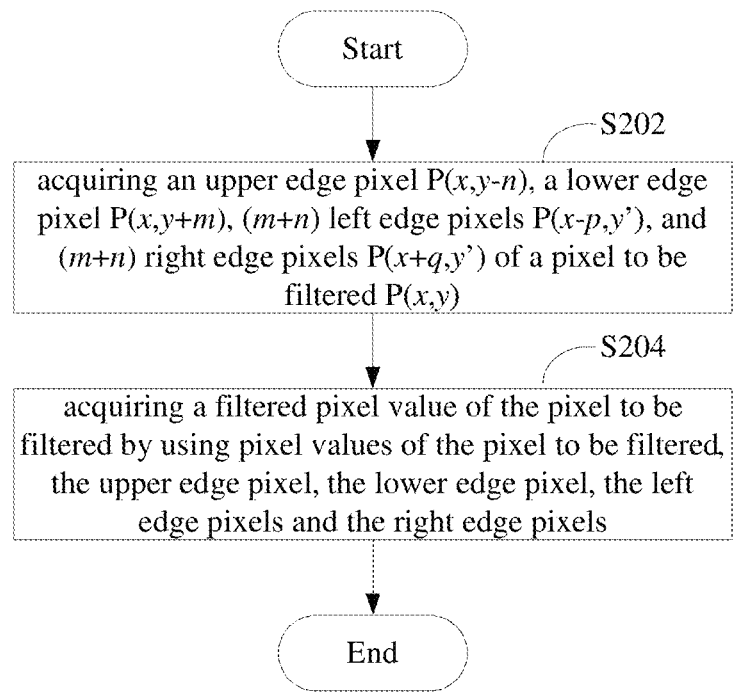
FIG. 2 illustrates a flow diagram of an edge-preserving filtering method in accordance with an embodiment of the invention.

FIG. 1 illustrates a block diagram of an edge-preserving filtering apparatus in accordance with an embodiment of the invention. FIG. 2 illustrates a flow diagram of an edge-preserving filtering method in accordance with an embodiment of the invention. Next, the edge-preserving filtering method and apparatus in accordance with an embodiment of the invention will be described in detail with reference to FIG. 1 and FIG. 2.

As shown in FIG. 1, the edge-preserving filtering apparatus in accordance with an embodiment of the invention comprises an edge acquiring unit 102 and a pixel filtering unit 104. The edge acquiring unit 102 is used for acquiring an upper edge pixel P(x,y−n), a lower edge pixel P(x,y+m), (m+n) left edge pixels P(x−p,y'), and (m+n) right edge pixels P(x+q,y') of a pixel to be filtered P(x,y) (i.e., implementing step S202). The pixel filtering unit 104 is used for acquiring a filtered pixel value of the pixel to be filtered by using pixel values of the pixel to be filtered and its upper edge pixel, lower edge pixel, left edge pixels and right edge pixels (i.e., implementing step S204). It should be noted that "x", "y", "m", "n", "p" and "q" are all positive integers, and "y'" takes an integer larger than "y−n" and less than "y+m" in turn.

Next, specific processing of the edge acquiring unit 102 and the pixel filtering unit 104 will be described.

1. The edge acquiring unit 102 starts from the pixel to be filtered P(x,y), and acquires its edge information (i.e., acquiring its edge pixels).

Acquiring the edge pixels comprises two passes of acquiring edge pixels in the vertical direction and acquiring edge pixels in the horizontal direction. Here, it is assumed that intensity values of three color channels of the pixel to be filtered P(x,y) are r(x,y), g(x,y) and b(x,y).

Firstly, an upper edge pixel in the vertical direction of the pixel to be filtered P(x,y) is acquired. Specifically, judgment is made with respect to pixels P(x,y−1), P(x,y−2), . . . , P(x,y−n) in turn. If P(x,y−n) meets the following conditions, then P(x,y−n) is judged as the upper edge pixel of the pixel to be filtered P(x,y):

$$\sum_{i=1}^{n} (|r(x, y-i) - r(x, y-i+1)| + |g(x, y-i) - g(x, y-i+1)| +$$
$$|b(x, y-i) - b(x, y-i+1)|) \geq \text{thresh}$$

and $$\sum_{i=1}^{n-1} (|r(x, y-i) - r(x, y-i+1)| +$$
$$|g(x, y-i) - g(x, y-i+1)| + |b(x, y-i) - b(x, y-i+1)|) < \text{thresh}$$

Then, a lower edge pixel in the vertical direction of the pixel to be filtered P(x,y) is acquired. Specifically, judgment is made with respect to pixels P(x,y+1), P(x,y+2), . . . , P(x,y+m) in turn. If P(x,y+m) meets the following conditions, then P(x,y+m) is judged as the lower edge pixel of the pixel to be filtered P(x,y):

$$\sum_{i=1}^{m} (|r(x, y+i) - r(x, y+i-1)| + |g(x, y+i) - g(x, y+i-1)| +$$
$$|b(x, y+i) - b(x, y+i-1)|) \geq \text{thresh}$$

and $$\sum_{i=1}^{m-1} (|r(x, y+i) - r(x, y+i-1)| +$$
$$|g(x, y+i) - g(x, y+i-1)| + |b(x, y+i) - b(x, y+i-1)|) < \text{thresh}$$

Next, for each pixel P(x,y') (y−n<y'<y+m) between the upper and lower edge pixels of the pixel to be filtered P(x,y), a left edge pixel in the horizontal direction of the pixel P(x,y') (i.e., a left edge pixel of the pixel to be filtered P(x,y)) is acquired. Specifically, judgment is made with respect to pixels P(x−1,y'), P(x−2,y'), . . . , P(x−p,y') in turn. If P(x−p,y') meets the following conditions, then P(x−p,y') is determined as the left edge pixel of the pixel P(x,y'):

$$\sum_{i=1}^{p} (|r(x-p, y') - r(x-p+1, y')| + |g(x-i, y') - g(x-i+1, y')| +$$
$$|b(x-i, y') - b(x-i+1, y')|) \geq \text{thresh}$$

and $$\sum_{i=1}^{p-1} (|r(x-p, y') - r(x-p+1, y')| + |g(x-i, y') - g(x-i+1, y')| +$$
$$|b(x-i, y') - b(x-i+1, y')|) < \text{thresh}$$

Next, for each pixel P(x,y') (y−n<y'<y+m) between the upper and lower edge pixels of the pixel to be filtered P(x,y), a right edge pixel in the horizontal direction of the pixel P(x,y') (i.e., a right edge pixel of the pixel to be filtered P(x,y)) is found out. Specifically, judgment is made with respect to pixels P(x+1, y'), P(x+2,y'), . . . , P(x+q,y') in turn. If P(x+q,y') meets the following conditions, then P(x+q,y') is judged as the right edge pixel in the horizontal direction of the pixel P(x,y'):

$$\sum_{i=1}^{q} (|r(x+q, y') - r(x+q-1, y')| + |g(x+q, y') - g(x+q-1, y')| +$$
$$|b(x+q, y') - b(x+q-1, y')|) \geq \text{thresh}$$

and $$\sum_{i=1}^{q-1} (|r(x+q, y') - r(x+q-1, y')| + |g(x+q, y') - g(x+q-1, y')| +$$
$$|b(x+q, y') - b(x+q-1, y')|) < \text{thresh}$$

It should be noted that the thresh for acquiring the upper edge pixel, the lower edge pixel, the left edge pixels and the right edge pixels of the pixel to be filtered is a same constant.

Figure 3:
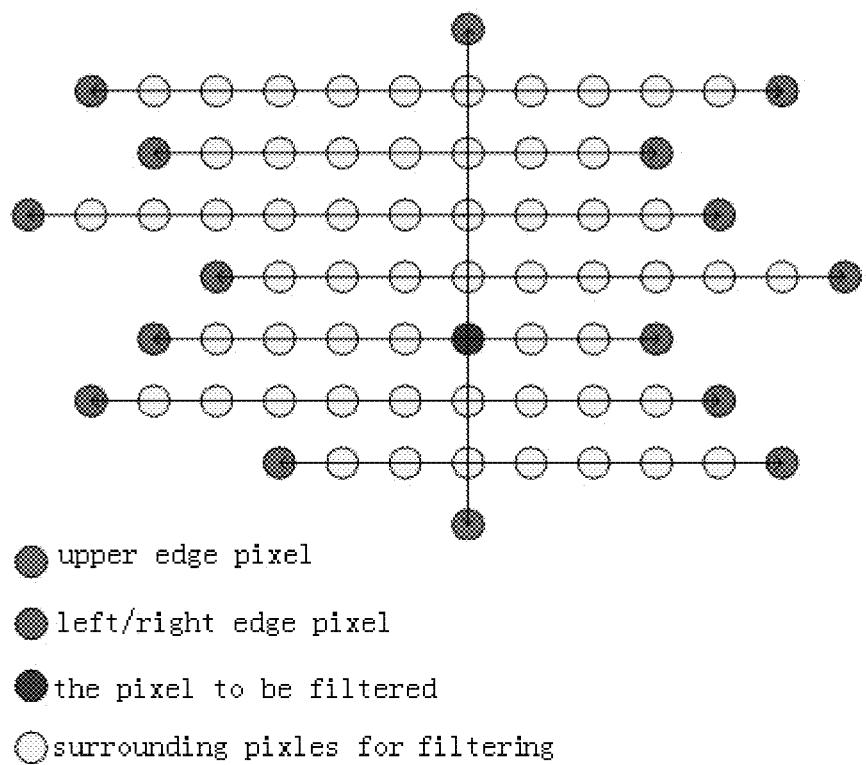
FIG. 3 illustrates exemplary edge information for edge-persevering filtering a pixel to be filtered.

FIG. 3 illustrates exemplary edge information for edge-persevering filtering the pixel to be filtered. As can be seen from FIG. 3, the set of pixels for edge-persevering filtering the pixel to be filtered comprise the pixel to be filtered and its left edge pixels, right edge pixels, upper pixel and lower pixel.

2. The pixel filtering unit 104 utilizes pixels in the set of pixels to implement edge-persevering filtering for the pixel to be filtered.

Specifically, the filtered pixel value of the pixel to be filtered is calculated by weighted averaging pixel values of all pixels in the set of pixels described above (e.g., intensities of R, G or B channels). It is assumed that the number of pixels in the above set of pixels is "n", then the filtered pixel value of the pixel to be filtered is the following:

$$p = \sum_{i=0}^{n-1} k_i p_i$$

$$\sum_{i=0}^{n-1} k_i = 1$$

As can be seen, the edge-preserving filtering method and apparatus in accordance with an embodiment of the invention utilize the edge information around the pixel to be filtered to swiftly acquire a set of pixels for filtering the pixel to be filtered, and thus implements edge-persevering filtering.

Although the invention has been described with reference to detailed embodiments of the invention, those skilled in the art would understand that modifications, combinations and changes may be done to the specific embodiments without departing from the scope and spirit of the invention as defined by the appended claims and the equivalents thereof.

Hardware or software may be used to perform the steps as required. It should be noted that under the premise of not departing from the scope of the invention, the steps may be amended, added to or removed from the flow chart provided by the description. Generally, a flow chart is only one possible sequence of basic operations performing functions.

Embodiments of the invention may be implemented using a general programmable digital computer, a specific integrated circuit, programmable logic devices, a field-programmable gate array, and optical, chemical, biological, quantum or nano-engineering systems, components and institutions. Generally, functions of the invention may be realized by any means known to those skilled in the art. Distributed or networked systems, components and circuits may be used. And data may be transmitted wired, wirelessly, or by any other means.

It shall be realized that one or more elements illustrated in the accompanying drawings may be realized in a more separated or more integrated method; they would even be allowed to be removed or disabled under some conditions. Realizing programs or codes capable of being stored in machine readable media so as to enable a computer to perform the aforementioned method also fails within spirit and scope of the invention.

Additionally, any arrows in the accompanying drawings shall be regarded as being exemplary rather than limiting. And unless otherwise indicated in detail, combinations of components and steps shall be regarded as being recorded when terms are foreseen as leading unclearness to the ability for separating or combining.

What is claimed is:

1. An edge-preserving filtering method used in a digital image processing apparatus, comprising:
    acquiring, by at least a first hardware processor, an upper edge pixel P(x,y−n), a lower edge pixel P(x,y+m), (m+n) left edge pixels P(x−p,y), and (m+n) right edge pixels P(x+q,y) of a pixel to be filtered P(x,y), wherein "x", "y", "m", "n", "p" and "q" are all positive integers, and "y'" takes an integer larger than "y−n" and less than "y+m" in turn;
    acquiring, by at least a second hardware processor, a filtered pixel value of the pixel to be filtered by using pixel values of the pixel to be filtered, the upper edge pixel, the lower edge pixel, the left edge pixels and the right edge pixels.

2. The edge-preserving filtering method used in a digital image processing apparatus of claim 1, wherein the processing of acquiring the filtered pixel value of the pixel to be filtered comprises:
    calculating a weighted average of the pixel values of the pixel to be filtered, the upper edge pixel, the lower edge pixel, the left edge pixels and the right edge pixels, as the filtered pixel value of the pixel to be filtered.

3. The edge-preserving filtering method used in a digital image processing apparatus of claim 1, wherein the processing of acquiring the upper edge pixel P(x,y−n) comprises:
    calculating a sum of absolute gradients of three color channels of pixels P(x,y−1), P(x,y−2), ..., P(x,y−n+1), P(x,y−n) above the pixel to be filtered P(x,y);
    if the sum of the absolute gradients of three color channels of the pixels P(x,y−1), P(x,y−2), ..., P(x,y−n+1), P(x,y−n) is not less than a predetermined threshold, and a sum of absolute gradients of three color channels of the pixels P(x,y−1), P(x,y−2), ..., P(x,y−n+1) is less than the predetermined threshold, then determining that the pixel P(x,y−n) is the upper edge pixel of the pixel to be filtered P(x,y).

4. The edge-preserving filtering method used in a digital image processing apparatus of claim 1, wherein the processing of acquiring the lower edge pixel P(x,y+m) comprises:
    calculating a sum of absolute gradients of three color channels of pixels P(x,y+1), P(x,y+2), ..., P(x,y+m−1), P(x,y+m) below the pixel to be filtered P(x,y);
    if the sum of the absolute gradients of three color channels of the pixels P(x,y+1), P(x,y+2), ..., P(x,y+m−1), P(x,y+m) is not less than the predetermined threshold, and a sum of absolute gradients of three color channels of the pixels P(x,y+1), P(x,y+2), ..., P(x,y+m−1) is less than the predetermined threshold, then determining that the pixel P(x,y+m) is the lower edge pixel of the pixel to be filtered P(x,y).

5. The edge-preserving filtering method used in a digital image processing apparatus of claim 1, wherein the processing of acquiring a left edge pixel P(x−p,y') of the pixel to be filtered P(x,y) comprises:
    calculating a sum of absolute gradients of three color channels of pixels P(x−1, y'), P(x−2, y'), ..., P(x−p+1,y'), P(x−p,y') on the left of the pixel P(x,y');
    if the sum of the absolute gradients of three color channels of the pixels P(x−1, y'), P(x−2, y'), ..., P(x−p+1,y'), P(x−p,y') is not less than the predetermined threshold, and a sum of absolute gradients of three color channels of the pixels P(x−1,y'), P(x−2, y'), ..., P(x−p+1,y') is less than the predetermined threshold, then determining that the pixel P(x−p,y') is a left edge pixel of the pixel to be filtered P(x,y).

6. The edge-preserving filtering method used in a digital image processing apparatus of claim 1, wherein the processing of acquiring a right edge pixel P(x+q,y') of the pixel to be filtered P(x,y) comprises:
    calculating a sum of absolute gradients of three color channels of pixels P(x+1, y'), P(x+2, y'), ..., P(x+q−1,y'), P(x+q,y') on the right of the pixel P(x,y');
    if a sum of absolute gradients of three color channels of the pixels P(x+1,y'), P(x+2,y'), ..., P(x+q−1,y'), P(x+q,y') is not less than the predetermined threshold, and a sum of absolute gradients of three color channels of the pixels P(x+1 y'), P(x+2, y'), ..., P(x+q−1,y') is less than the predetermined threshold, then determining that the pixel P(x+q,y') is a right edge pixel of the pixel to be filtered P(x,y).

7. An edge-preserving filtering apparatus, comprising:
    an edge acquiring unit for acquiring an upper edge pixel P(x,y−n), a lower edge pixel P(x,y+m), (m+n) left edge pixels P(x−p,y'), and (m+n) right edge pixels P(x+q,y') of a pixel to be filtered P(x,y), wherein "x", "y", "m", "n", "p" and "q" are all positive integers, and "y'" takes an integer larger than "y−n" and less than "y+m" in turn;
    a pixel filtering unit for acquiring a filtered pixel value of the pixel to be filtered by using pixel values of the pixel to be filtered, the upper edge pixel, the lower edge pixel, the left edge pixels and the right edge pixels.

8. The edge-preserving filtering apparatus of claim 7, characterized in that the pixel filtering unit calculates a weighted average of the pixel values of the pixel to be filtered, the upper edge pixel, the lower edge pixel, the left edge pixels and the right edge pixels, as the filtered pixel value of the pixel to be filtered.

9. The edge-preserving filtering apparatus of claim 7, characterized in that the edge acquiring unit acquires the upper edge pixel P(x,y−n) by the following processing:

calculating a sum of absolute gradients of three color channels of pixels P(x,y−1), P(x,y−2), . . . , P(x,y−n+1), P(x,y−n) above the pixel to be filtered P(x,y);

if the sum of the absolute gradients of three color channels of the pixels P(x,y−1), P(x,y−2), . . . , P(x,y−n+1), P(x,y−n) is not less than a predetermined threshold, and a sum of absolute gradients of three color channels of the pixels P(x,y−1), P(x,y−2), . . . , P(x,y−n+1) is less than the predetermined threshold, then determining that the pixel P(x,y−n) is the upper edge pixel of the pixel to be filtered P(x,y).

10. The edge-preserving filtering apparatus of claim 7, characterized in that the edge acquiring unit acquires the lower edge pixel P(x,y+m) by the following processing:

calculating a sum of absolute gradients of three color channels of pixels P(x,y+1), P(x,y+2), . . . , P(x,y+m−1), P(x,y+m) below the pixel to be filtered P(x,y);

if the sum of the absolute gradients of three color channels of the pixels P(x,y+1), P(x,y+2), . . . , P(x,y+m−1), P(x,y+m) is not less than the predetermined threshold, and a sum of absolute gradients of three color channels of the pixels P(x,y+1), P(x,y+2), . . . , P(x,y+m−1) is less than the predetermined threshold, then determining that the pixel P(x,y+m) is the lower edge pixel of the pixel to be filtered P(x,y).

11. The edge-preserving filtering apparatus of claim 7, characterized in that the edge acquiring unit acquires a left edge pixel P(x−p,y') of the pixel to be filtered P(x,y) by the following processing:

calculating a sum of absolute gradients of three color channels of pixels P(x−1, y'), P(x−2, y'), . . . , P(x−p+1,y'), P(x−p,y') on the left of the pixel P(x,y');

if the sum of the absolute gradients of three color channels of the pixels P(x−1, y'), P(x−2, y'), . . . , P(x−p+1,y'), P(x−p,y') is not less than the predetermined threshold, and a sum of the absolute gradients of three color channels of the pixels P(x−1 y'), P(x−2, y'), . . . , P(x−p+1,y) is less than the predetermined threshold, then determining that the pixel P(x−p,y) is a left edge pixel of the pixel to be filtered P(x,y).

12. The edge-preserving filtering apparatus of claim 7, characterized in that the edge acquiring unit acquires a right edge pixel P(x+q,y) of the pixel to be filtered P(x,y) by the following processing:

calculating a sum of absolute gradients of three color channels of pixels P(x+1, y'), P(x+2, y'), . . . , P(x+q−1,y'), P(x+q,y') on the right of the pixel P(x,y');

if the sum of absolute gradients of the pixels P(x+1,y'), P(x+2,y'), . . . , P(x+q−1,y'), P(x+q,y') is not less than the predetermined threshold, and a sum of the absolute gradients of three color channels of the pixels P(x+1, y'), P(x+2, y'), . . . , P(x+q−1,y') is less than the predetermined threshold, then determining that the pixel P(x+q, y') is a right edge pixel of the pixel to be filtered P(x,y).

* * * * *

UNITED STATES PATENT AND TRADEMARK OFFICE
CERTIFICATE OF CORRECTION

PATENT NO.        : 9,031,348 B2                                  Page 1 of 1
APPLICATION NO.   : 13/835581
DATED             : May 12, 2015
INVENTOR(S)       : Bai Xianghui It is certified that error appears in the above-identified patent and that said Letters Patent is hereby corrected as shown below:

In the Claims

Column 5, Line 44, In Claim 1, delete "$P(x-p,y)$" and insert -- $P(x-p,y')$ --, therefor.
Column 5, Line 45, In Claim 1, delete "$P(x+q,y)$" and insert -- $P(x+q,y')$ --, therefor.
Column 8, Line 12, In Claim 11, delete "$P(x-p+1,y)$" and insert -- $P(x-p+1,y')$ --, therefor.
Column 8, Line 14, In Claim 11, delete "$P(x-p,y)$" and insert -- $P(x-p,y')$ --, therefor.

Signed and Sealed this
Eighteenth Day of August, 2015

Michelle K. Lee
*Director of the United States Patent and Trademark Office*